(12) United States Patent
Chen

(10) Patent No.: US 12,324,417 B2
(45) Date of Patent: Jun. 10, 2025

(54) PET RESTRAINT BAG

(71) Applicant: Su-Chun Chen, New Taipei (TW)

(72) Inventor: Su-Chun Chen, New Taipei (TW)

( * ) Notice: Subject to any disclaimer, the term of this patent is extended or adjusted under 35 U.S.C. 154(b) by 48 days.

(21) Appl. No.: 18/089,605

(22) Filed: Dec. 28, 2022

(65) Prior Publication Data

US 2024/0215531 A1 Jul. 4, 2024

(51) Int. Cl.
*A01K 15/04* (2006.01)
*A01K 1/02* (2006.01)

(52) U.S. Cl.
CPC ............ *A01K 15/04* (2013.01); *A01K 1/0254* (2013.01)

(58) Field of Classification Search
CPC .. A01K 1/0254; A01K 1/0272; A01K 1/0281; A01K 1/029; B65D 33/00; A61D 3/00; A61D 2003/006
USPC ................................................ 383/61.1, 61.4
See application file for complete search history.

(56) References Cited

U.S. PATENT DOCUMENTS

| | | | | |
|---|---|---|---|---|
| 665,942 | A * | 1/1901 | Tabler | B65D 33/28 383/61.4 |
| 1,211,853 | A * | 1/1917 | Huggins | B65D 33/10 383/61.4 |
| 3,547,079 | A * | 12/1970 | Bassett | A01K 1/0254 383/41 |
| 4,137,870 | A * | 2/1979 | Cano | A01K 13/006 119/416 |
| 5,692,660 | A * | 12/1997 | Stewart | A45C 3/00 190/103 |
| 8,801,286 | B2 * | 8/2014 | Tatsuno | A45C 3/001 383/41 |
| 2006/0060155 | A1 * | 3/2006 | Ip | A61D 3/00 119/850 |
| 2016/0135561 | A1 * | 5/2016 | Gaspero | A45C 13/02 150/112 |
| 2019/0045741 | A1 * | 2/2019 | Lu | A01K 1/0281 |
| 2019/0274404 | A1 * | 9/2019 | Riley | A45C 3/001 |
| 2022/0015328 | A1 * | 1/2022 | Ross | A01K 1/06 |
| 2023/0232948 | A1 * | 7/2023 | Wang | A45C 13/02 150/105 |
| 2024/0115022 | A1 * | 4/2024 | Caldera | A45C 3/06 |
| 2024/0224930 | A1 * | 7/2024 | Bullock | A01K 1/0245 |

* cited by examiner

*Primary Examiner* — Tien Q Dinh
*Assistant Examiner* — Katherine June Walter
(74) *Attorney, Agent, or Firm* — Leong C. Lei

(57) ABSTRACT

A pet restraint bag includes an outer layer body including a first open end having a first closing member selectively closing the first open end, a closed end, and a first extension portion having a length having two ends respectively connected to the first open end and the closed end, the outer layer body having an internal receiving space, the first extension portion having a through opening; and an inner layer body receivable in the receiving space and including a second open end having a second closing member selectively closing the second open end, a third open end, and a second extension portion having a length having two ends respectively connected to the second open end and the third open end, the third open end being connected to an inside of the first extension portion.

6 Claims, 7 Drawing Sheets

PET RESTRAINT BAG

TECHNICAL FIELD OF THE INVENTION

The present invention relates generally to a pet restraining device, and more particularly to a pet restraint bag that allows efficient and safe restraint of a pet.

DESCRIPTION OF THE PRIOR ART

People of the modern age often treat pets like family members and are willing to have therapy, rehabilitation, or even beauty treatment practiced on the pets. However, the pets may be afraid of such activities, and it often need to forcibly hold the limbs of the pets with additional human labor or applying inhuman equipment (such as a constraining cage) to handle any situation of pet escaping. This is time-consuming and labor-consuming, and also adds pains and strains to the pets.

To cope with such problems, the prior art provides an animal restraining device. The known animal restraining device is made up of an adjustable frame and a suspending device combined with the frame. The frame is adjustable in respect of a size, while the suspending device is adjustable in respect of a front-rear distance in order to accommodate the body shape of a pet. The suspending device is then put on the limbs of the pet and is suspended on the frame for fixing. The prior art still suffering the following deficiencies.

(1) The frame (main frame) allows only adjustment of size in a top-down direction, and is incapable of adjustment conducted in a left-right direction or a front-rear direction, making it difficult to accommodate various body shapes of a variety of pets.

(2) The suspending device (restraining unit) is connected to a connection bar of a preset fixing part of the frame, so that when the body shape of a pet is excessively large or excessive small, the location of the fixing part of the connection bar being not flexibly changeable makes mounting of the suspending device difficult.

(3) The known animal restraining device requires a user to catch or hold a pet, which can be violent, with bare hands before the pet can be placed in the animal restraining device, and this is risky for both sides during the process of catching the pet.

SUMMARY OF THE INVENTION

The primary objective of the present invention is to provide a pet restraint bag, which comprises: an outer layer body, which comprises a first open end, a first extension portion, and a closed end, wherein the outer layer body forms, in an interior thereof, with a receiving space; the first open end is provided with a first closing member, such that the first closing member selectively closes the first open end; the first extension portion has a predetermined length that has two ends respectively connected to the first open end and the closed end; and the first extension portion is formed with at least one through opening; and an inner layer body, which is arranged in the receiving space and comprises a second open end, a second extension portion, and a third open end, wherein the second open end is provided with a second closing member, such that the second closing member selectively closes the second open end; the second extension portion has a predetermined length that has two ends respectively connected to the second open end and the third open end; and the third open end is received in and combined with an inside of the first extension portion.

DETAILED DESCRIPTION OF THE PREFERRED EMBODIMENT

Figure 1:
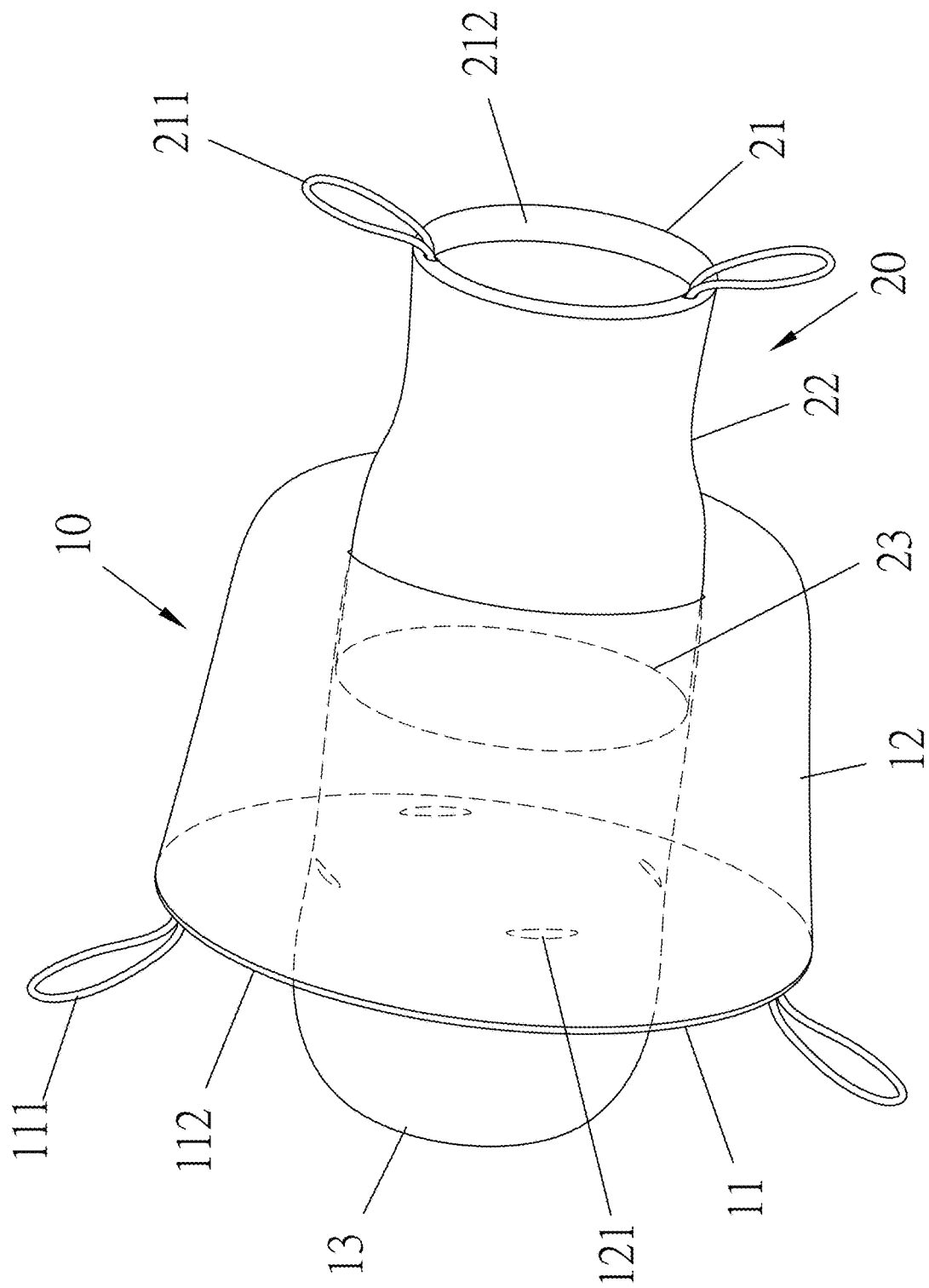
FIG. 1 is a perspective view of the present invention.
Figure 2:
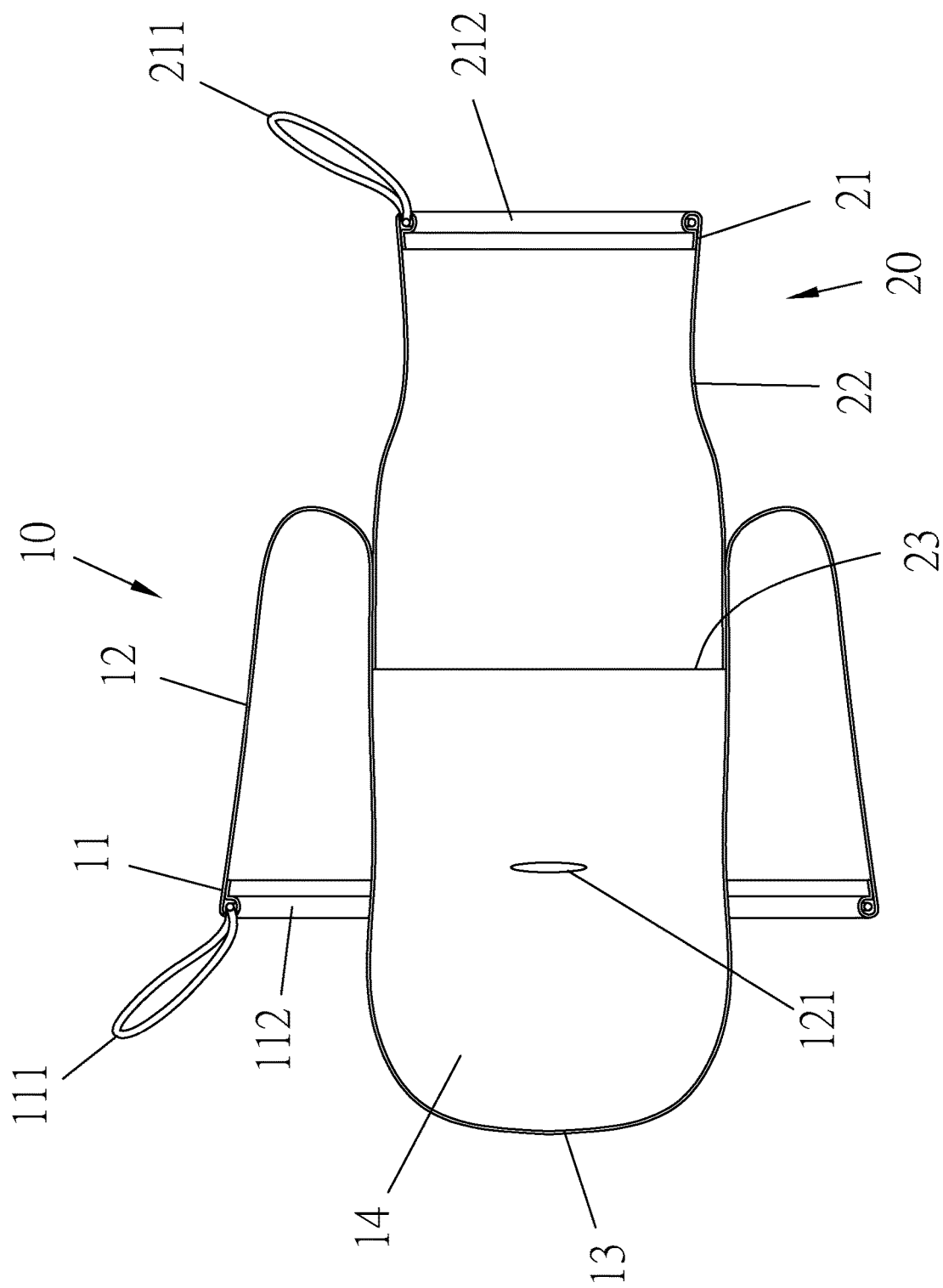
FIG. 2 is a cross-sectional view of FIG. 1.

To expound the contents of the present invention, and the efficacy achieved thereby, an embodiment is provided below with reference to the drawings. Referring to FIGS. 1 and 2, the present invention provides a pet restraint bag, which comprises:

an outer layer body 10, which comprises a first open end 11, a first extension portion 12, and a closed end 13, wherein the outer layer body 10 forms, in an interior thereof, with a receiving space 14; the first open end 11 is provided with a first closing member 111, such that the first closing member 111 selectively closes the first open end 11; the first extension portion 12 has a predetermined length that has two ends respectively connected to the first open end 11 and the closed end 13; and the first extension portion 12 is formed with at least one closable through hole 121; and an inner layer body 20, which is arranged in the receiving space 14 and comprises a second open end 21, a second extension portion 22, and a third open end 23, wherein the second open end 21 is provided with a second closing member 211, such that the second closing member 211 selectively closes the second open end 21; the second extension portion 22 has a predetermined length that has two ends respectively connected to the second open end 21 and the third open end 23; and the third open end 23 is received in and combined with an inside of the first extension portion 12.

The length of the outer layer body 10 is greater than the length of the inner layer body 20, so that a predetermined distance is presentable between the second open end 21 of the inner layer body 20 and the first open end 11 of the outer layer body 10.

The first open end 11 and the second open end 21 are each provided, on an inside surface thereof, with a channel 112, 212, and the first closing member 111 and the second closing member 211 are respectively arranged inside the channels 112, 212. The first closing member 111 and the second closing member 211 are each in the form of a rope or cable, so that the first closing member 111 and the second closing member 211 are separately pullable to respectively close the first open end 11 and the second open end 21. In other words, the first closing member 111 and the channel 112, and also, the second closing member 211 and the channel 212, form an opening tying structure, but not limited thereto, and alternative structures, such as hook-and-loop fastener or zipper can also be used.

Figure 3:
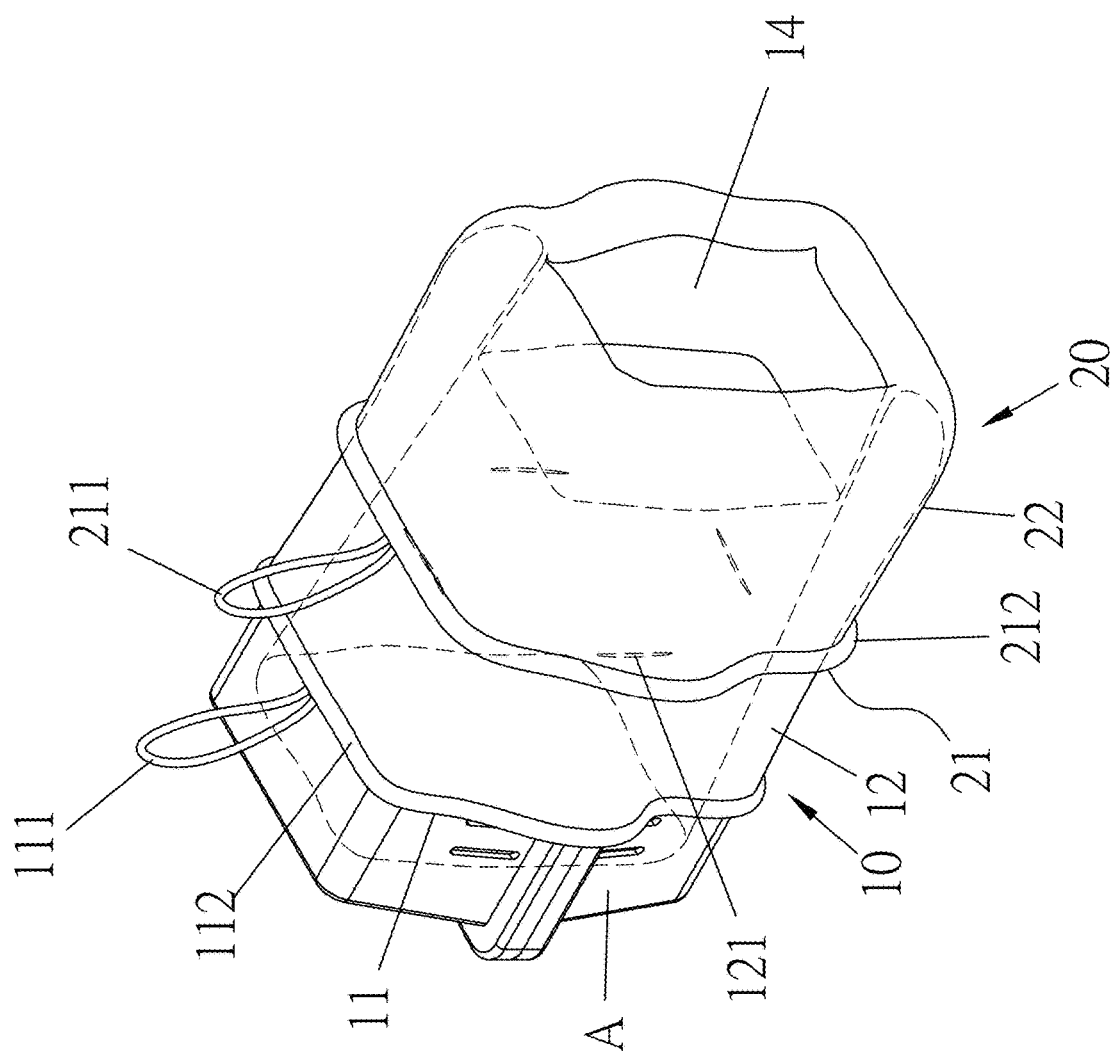
FIG. 3 is a schematic view showing a state of use of the present invention in combination with a rigid pet carrying cage.
Figure 4:
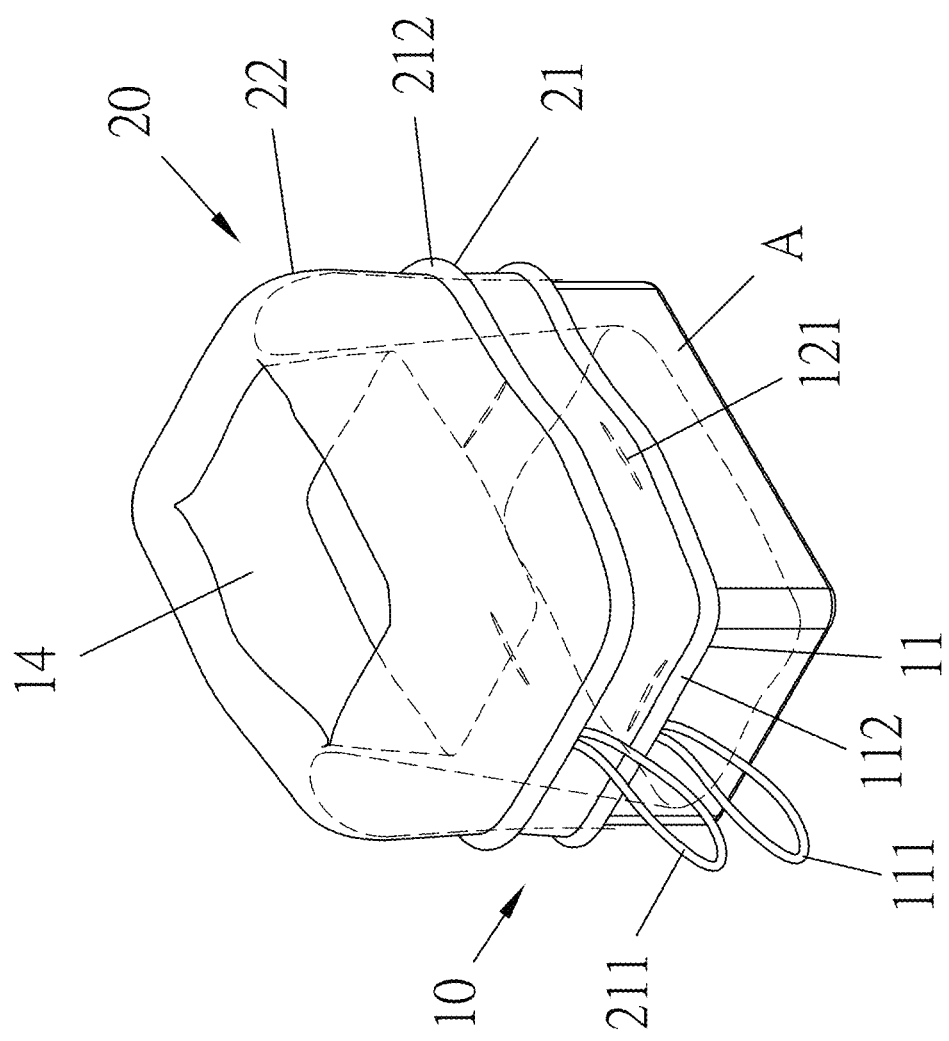
FIG. 4 is a schematic view showing a state of use of the present invention in combination with a box.

Referring to FIGS. 3 and 4, the outer layer body 10 is disposable in a container A. The container A comprises an opening (not shown) formed in a top or a sidewall thereof, and in the instant embodiment, the container A can be a case or a rigid pet carrying basket or cage.

The first open end 11 and the first extension portion 12 of the outer layer body 10, and the second open end 21, may extend out of the opening and are foldable backward over an outside of the container A, so that a user is allow to hold or grip the container A with a hand in such a way that the receiving space 14 of the present invention is directed toward a pet to force the pet into the receiving space 14, and the second closing member 211 and the first closing member 111 are then sequentially pulled in such an order to respectively close the second open end 21 and the first open end 11 to make up a double-layered structure that prevents the pet to escape therefrom.

Figure 5:
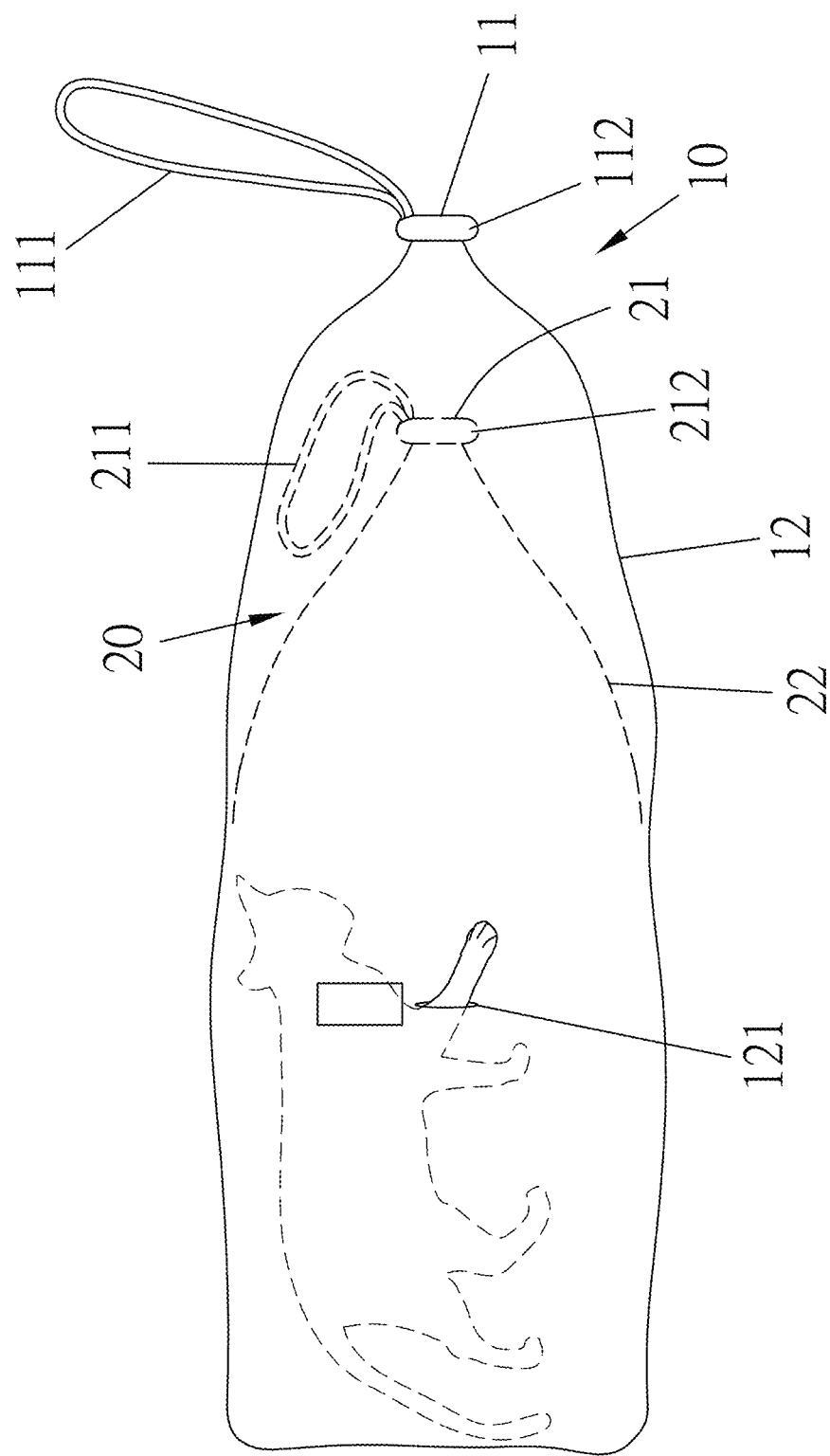
FIG. 5 is a schematic view showing a state in which a first end and a second end of the present invention are closed.

Referring to FIG. 5, to remove the pet restraint bag of the present invention from the container A, a tower is used in combination with the pet restraint bag of the present invention to restrain a violent pet (or animal), and pull out a portion of the pet that requires for example therapy through the through hole 121 in order to proceed with diagnosis, treatment, injection, or blood taking, and alternatively, the pet restraint bag of the present invention can allow a pet located therein to be securely held from the outside and a syringe may then extend through the through hole 121 into the bag to proceed with injection or blood taking.

Figure 6:
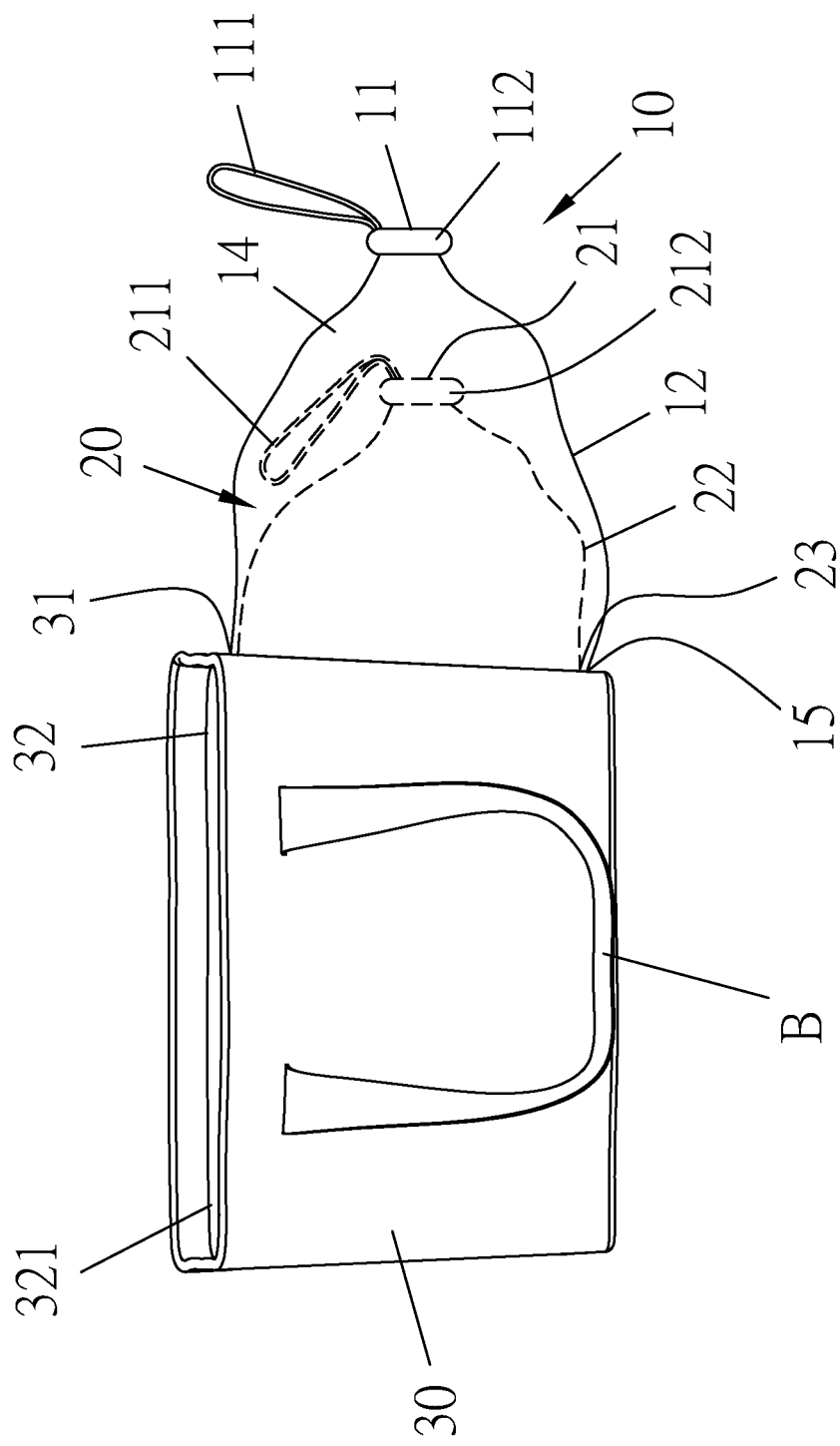
FIG. 6 is a schematic view showing an outside of another embodiment of the present invention.

Referring to FIG. 6, to easily move the pet restraint bag of the present invention, the first extension portion 12 is provided, on an outside thereof, with a plurality of carrying straps or handles B, and the first extension portion 12 may be provided, on the outside thereof, with a cover plate (not shown), so as to close the through hole with the cover plate.

Referring to FIG. 6, another embodiment of the present invention is shown, having a structure, which is similar to that of the previous embodiment, with description for the same features between the two being omitted herein, comprising:

an outer layer body 10, which comprises a first open end 11, a first extension portion 12, and a first coupling portion 15;

an inner layer body 20, which comprises a second open end 21, a second extension portion 22, and a third open end 23, wherein the inner layer body 20 is received in the receiving space 14; the second open end 21 is provided with a second closing member 211, such that the second closing member 211 selectively closes the second open end 21; and the third open end 23 is received in and combined with an inside of a first coupling portion 15; and a pet carrying bag 30, which comprises a first opening 31, a second opening 32, and a receiving space (not visible in the drawings), wherein the first opening 31 is combined with the first coupling portion 15, such that the receiving space 14 of the outer layer body 10 is connected to and in communication with the receiving space of the pet carrying bag 30; and at least one cover plate 321 is provided at one side of the second opening 32, such that the cover plate 321 selectively closes the second opening 32.

The instant embodiment can be used in the same way as that of the previous embodiment; however, the pet carrying bag 30 is the main body in respect of the outside appearance and the structure thereof, so that the pet carrying bag 30 additionally includes a function of restraint.

Figure 7:
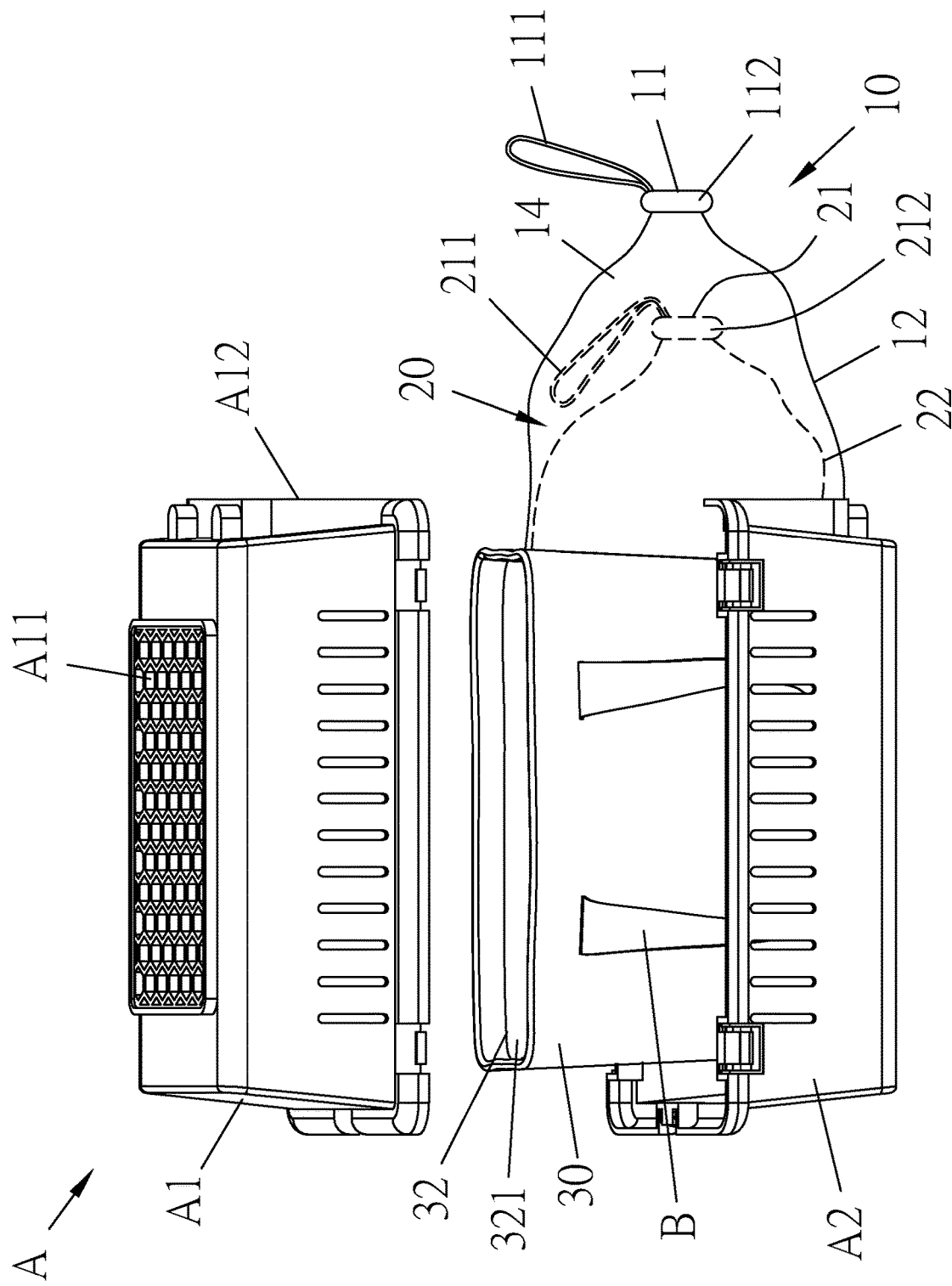
FIG. 7 is a schematic view showing a state of use of FIG. 6.

Referring to FIG. 7, further, the animal restraint bag according to the present invention is receivable in a container A, and in the instant embodiment, the container A is a rigid pet carrying basket or cage. The rigid pet carrying basket comprises an upper casing A1 and a lower casing A2. The upper casing A1 has a top that is provided with a first detachable door panel A11. The upper casing A is provided, on one side thereof, with an upper door frame A12, and the lower casing A2 is provided, on one side thereof, with a lower door frame A21. The upper casing A1 and the lower casing A2 are detachably combinable to have the upper door frame A12 and the lower door frame A21 corresponding to and mating with each other. A second detachable door panel (not shown) is arranged inside the upper door frame A12 and the lower door frame A21, so that by opening the first detachable door panel A11 or detaching the upper casing A1, the animal restraint bag according to the present invention in which a pet is enclosed may be retrieved.

I claim:

1. A pet restraint bag, comprising:
   an outer layer body, which comprises a first open end, a first extension portion, and a closed end, wherein the outer layer body forms, in an interior thereof, with a receiving space; the first open end is provided with a first closing member, such that the first closing member selectively closes the first open end; the first extension portion has a predetermined length that has two ends respectively connected to the first open end and the closed end; and the first extension portion is formed with at least one through opening; and
   an inner layer body, which is arranged in the receiving space and comprises a second open end, a second extension portion, and a third open end, wherein the second open end is provided with a second closing member, such that the second closing member selectively closes the second open end; the second extension portion has a predetermined length that has two ends respectively connected to the second open end and the third open end; and the third open end is received in and combined with an inside of the first extension portion,
   wherein the predetermined length of the second extension portion of the inner layer body is less than the predetermined length of the first extension portion of the outer layer body such that the inner layer body is entirely receivable in the receiving space of the outer layer body and the second extension portion extends alongside and separate from the first extension portion, wherein the second open end is located in the receiving space and spaced from the first open end, the second open end being closer to the first open end of the outer layer body than the third open end, wherein the second extension portion of the inner layer body and the first extension portion of the outer layer body jointly form a double-layered structure.

2. The pet restraint bag according to claim 1, wherein the length of the outer layer body is greater than the length of the inner layer body, so that a predetermined distance is presentable between the second open end of the inner layer body and the first open end of the outer layer body.

3. The pet restraint bag according to claim 1, wherein the first open end and the second open end are each provided, on an inside surface thereof, with a channel, and the first closing member and the second closing member are respectively arranged inside the channels, wherein the first closing member and the second closing member are each in the form of a rope, so that the first closing member and the second closing member are separately pullable to respectively close the first open end and the second open end.

4. The pet restraint bag according to claim 1, wherein the outer layer body is disposable in a container, the container forming an opening in a top or a sidewall thereof, the first open end, the first extension portion of the outer layer body, and the second open end being extendible out of the opening and then foldable backward over an outside of the container.

5. The pet restraint bag according to claim 4, wherein the container comprises a case or a rigid pet carrying basket.

6. The pet restraint bag according to claim 1, wherein the first extension portion is provided, on an outside thereof, with a plurality of carrying straps or handles, and the first extension portion is provided on an outside thereof with a cover plate, so as to close the through hole with the cover plate.

\* \* \* \* \*